United States Patent Office 3,519,921
Patented July 7, 1970

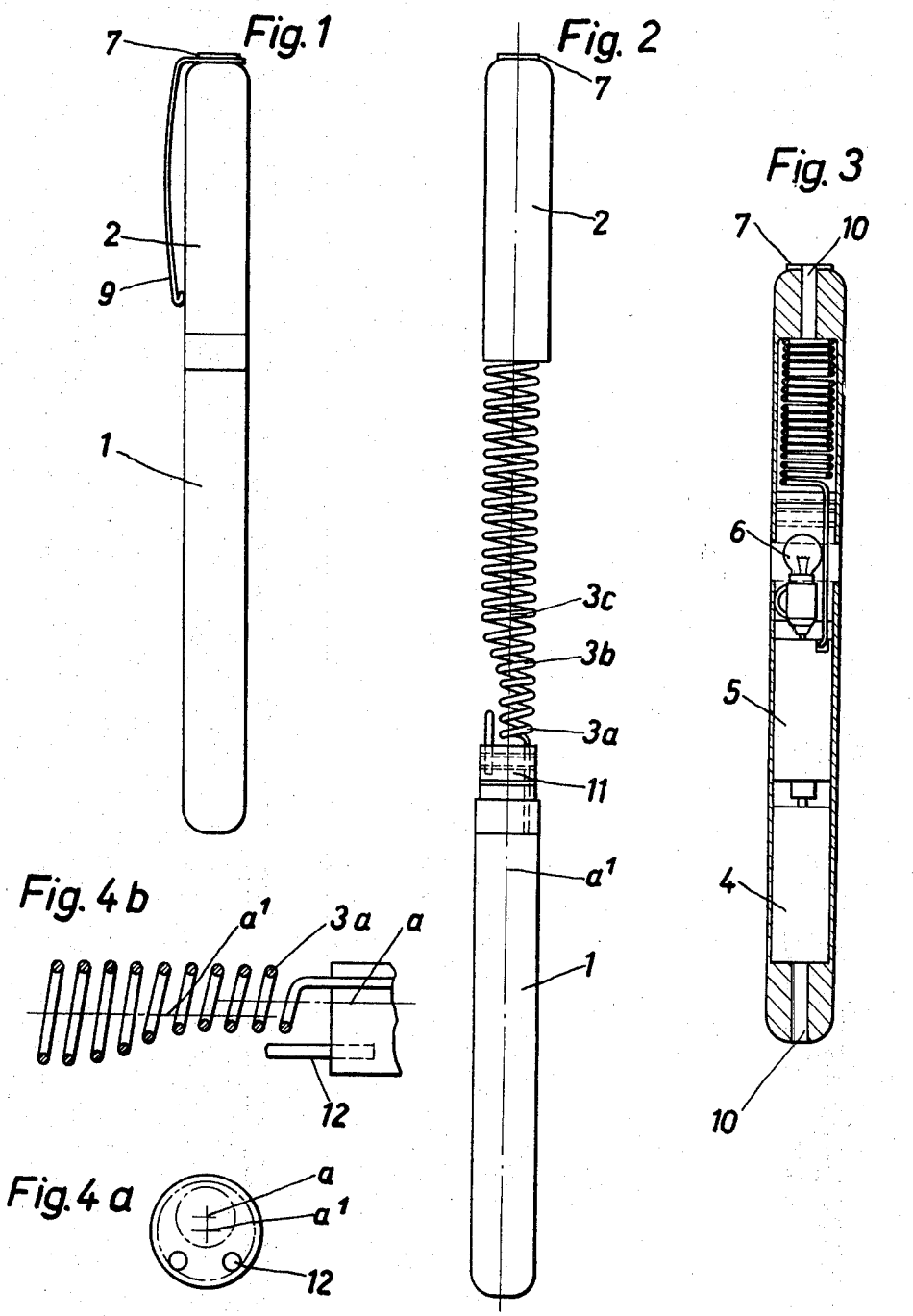

3,519,921
COMPACT ELECTRIC CONTINUITY TESTER HAVING A PAIR OF HANDLES CONNECTED BY A FLEXIBLE SPRING
Hubert Hetzler, Lauteschlagerstrasse 9, Darmstadt, Germany
Filed May 21, 1968, Ser. No. 730,747
Int. Cl. G01r 31/02
U.S. Cl. 324—51        12 Claims

ABSTRACT OF THE DISCLOSURE

The continuity tester consists of two handles which are connected to each other by a flexible spring. An acoustic or optic signal indicator is operated by a transistorized circuit and supplied by a battery all arranged within one handle. For testing the continuity within an electric circuit each handle has to be connected with one point of the tested electric device.

BACKGROUND OF THE INVENTION

The present invention relates to electric continuity testers. More particularly, the invention relates to improvements in electric continuity testers which are qualified to test high-impedance circuits for continuity or passage of electric current. Still more particularly, the invention relates to improvements in electric continuity testers which have small dimensions and are easy to handle and which allow simple transportation and especially rough handling without being damaged.

Normal electric circuits are tested for continuity or passage of electric current by simple continuity testers, wherein a battery and a lamp respectively a buzzer are connected in series so that the ends of the test leads similarly serve as a switch. High-impedance circuits, for example apparatus with motors, transformers, bulbs etc. have to be tested for continuity by ohmmeters. Normally available ohmmeters are relatively unwieldy and especially delicate.

A known continuity tester provides a testing pin being connected with the casing and is connected with another testing pin by an insulated lead. To wind up said lead a rotable drum is arranged within the casing of the continuity tester. When using this continuity tester there is the danger of damaging the lead especially in the region of the lead-through opening of the casing when unrolling or winding up so that the cable may break. Furtheron in this known continuity tester the electric contact between the lead and the dry battery serving as power supply is susceptible to trouble and not reliable. Finally it is unconvenient to wind up the lead again after use.

As presently known types of continuity testers are not entirely satisfactory it is an important object of the invention to provide a novel and improved continuity tester which is more reliable and easier to handle.

Another object of the invention is to provide a small and handy continuity tester.

SUMMARY OF THE INVENTION

One feature of my invention resides in the construction of an electric continuity tester comprising two handles which are connected by a flexible electric lead. This lead is wound-shaped arranged in contracted condition in a chamber of one sleeve-shaped handle and formed as an automatically contracting helical spring. One of the two handles houses a power source and a signal indicator and each handle may be provided with a test pin.

In a preferred embodiment of the invention the helical spring comprises a shorter section having a smaller diameter, a multiple longer section having a larger diameter and between them a transition region. The longer section in contracted condition is concentrically arranged within the one sleeve-shaped handle, while the shorter section having the smaller diameter is fixed to the other handle but excentrically to the axis of the sleeve-shaped handle. It is advantageous if the part of the handle to which the short section of the helical spring-shaped lead is fixed has two bore-holes, each containing one removable test pin. The axis of this shorter section of the helical spring is preferably arranged in the plane of symmetry of these two bore-holes, and then said test-pins may be easily housed besides the spring within the casing. Preferably there is a transistorized circuit arranged within one of the handles which operates a signal indicator e.g. a control lamp or a buzzer. This offers the advantage that not the comparatively strong current which is necessary to operate a control lamp or a buzzer, but only a very small current has to pass the spring and the circuit which is going to be tested.

The novel features which are considered as characteristic of the invention are set forth in particular in the appended claims. The improved continuity tester itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an elevational view on one embodiment of the continuity tester;

FIG. 2 is an elevational view of the continuity tester of FIG. 1, ready for operation;

FIG. 3 is a partly elevational and partly sectional view of the continuity tester of FIG. 1;

FIG. 4a is a plane view of one element of the continuity tester;

FIG. 4b is a sectional view of a detail of the construction;

DESCRIPTION OF THE PREFERRED EMBODIMENTS

Figure 5:
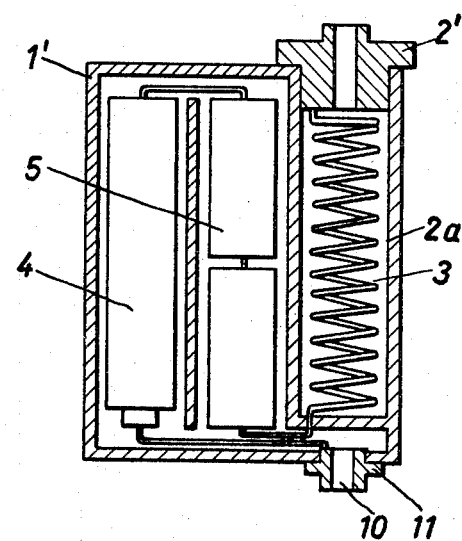
FIG. 5 is a partly elevational and partly sectional view of another embodiment of the invention.

The continuity tester mainly consists of two parts, namely the casing 1 and a cap 2 plugged on that casing 1 which are connected by a helical spring 3 arranged in chamber 2a.

FIG. 1 shows the continuity tester with the cap 2 plugged on the casing while FIG. 2 shows the same continuity tester with the cap taken off. The casing 1 of the continuity tester contains a battery 4, a circuit device 5 in which are arranged a transistor and other circuit elements and furthermore a control lamp 6. At the upper end of the cap 2 there is a metal jack 7 with a bore-hole which serves to plug in a test pin. At the lower end of the casing 1 there is a bore-hole 10 arranged coaxially to the bore-hole of the metal jack 7. Both bore-holes have an inner diameter of 2.6 mm. Consequently the banana pin of a normal test lead can easily be plugged into the two bore-holes if this is desired.

To test an electric circuit or an electric apparatus, for example a motor, for continuity or passage of electric current the casing 1 or a test pin inserted into the bore-hole 10 is connected with one point of connection and the metal jack 7 or its clip 9 is connected with the other point of connection of the electric device that is to be tested. Cap 2 as shown in FIG. 2 is only connected with casing 1 by the helical spring 3 extended to a greater length. If an electric current supplied by the built-in battery 4 can flow between the two test points of the tested electric device, then control lamp 6 will be lighted up by means of the circuit device 5 which may be a transistorized circuit. The helical spring 3 comprises a cylindrical section 3a having an external diameter of 6.5 mm., a mainly conical transition region 3b and a cylindrical section 3c having an external diameter of 13 mm. The helical spring 3 is mounted on a plate 11 in such a way that axis a is arranged excentrical to the casing 1 as clearly shown in FIGS. 4a and 4c. Two test pins 12 are inserted into two bore-holes of the plate 11 in this way that they can easily be taken out and inserted into the bore-holes 10 of the casing 1 and the cap 2. The length of the section 3a having a smaller diameter of the helical spring is much shorter than the length of the section 3c having a larger diameter. Besides the above described special shaped helical spring 3 there is sufficient room for the inserted test pins 12 even in transport position of the continuity tester when the helical spring is in its contracted position.

Figure 6:
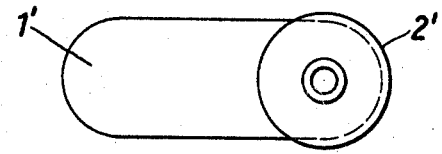
FIG. 6 is a plane view of the continuity tester of FIG. 5.

Another embodiment of the continuity tester is shown in FIGS. 5 and 6. A casing 1' has a shorter height and a larger width than the casing 1 in FIGS. 1 to 4 above described. A cap 2' connected with this casing by the schematically shown helical spring 3 serves as a closing cap and covers a chamber of the casing 1' in which the helical spring 3 is housed. The casing 1' contains a circuit device 5 comprising a transistor and other associated circuit elements. The casing 1' also contains a buzzer 6' supplied by battery 4. The buzzer will be operated if an external conductive connection is established between cap 2' and the metal part 11.

To test an electric device for passage of current, cap 2' is removed from the casing 1' and connected with a test point, while the metal part 11 is set on the other test point. In case of need the banana pin of a test lead can be inserted into the bore-hole of the cap 2' as well as into the bore-hole 10 of the metal part 11 if the passage of current has to be tested between two test points having a large distance.

FIG. 5 shows schematically the connections between battery 4, circuit device 5, buzzer 6', helical spring 3, cap 2' and metal part 11.

Cap 2' is provided with a protruding rim so that it can easily be taken out of the casing 1'. Cap 2' may be provided with a thread so that it may be screwed on casing 1' and thus be fastened there. Also in the embodiment shown in FIGS. 1 to 4 the lower end of cap 2 and the upper end of casing 1 may be provided with a thread to fasten said cap on said casing.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. An electric continuity testing device comprising, in combination, an elongated tubular casing including two separable connected sections each having an open end and a closed end, the open end of one of said sections being receivable in the open end of the other of said sections; a source of electrical energy and signal-generating means both accommodated in the interior of one of said sections; a helically coiled electrically insulated contractile lead normally accommodated in contracted state in the interior of the other of said sections and having one convoluted end portion fast with said other section and another convoluted end portion fast with said one section and being connected in internal circuit with said source of electrical energy and said signal generating means, said lead being extensible so as to extend from said other section in response to separation of said sections from one another; and connecting means for connecting said internal circuit with an external circuit whose continuity is to be tested.

2. A device as defined in claim 1, wherein the convolutions of said one end portion have a first diameter, the convolutions of said second end portion have a smaller second diameter, and wherein said lead further comprises an intermediate portion between said end portions.

3. A device as defined in claim 1, wherein said casing has a longitudinal axis common to both of said sections when said open end of said one section is received in said open end of said other section, and wherein said second end portion is connected to said one section eccentrically with reference to said longitudinal axis.

4. A device as defined in claim 3, said one section including an insert in the region of said open end thereof, said insert being provided with a pair of apertures; and wherein said connecting means includes a pair of electrically conductive test probes each receivably accommodated in one of said apertures for storage when said sections are connected and said device is not in use.

5. A device as defined in claim 2, wherein the diameter of the convolutions of said other end portion is smaller by at least substantially forty percent (40%) than the diameter of the convolutions of said one end portion.

6. A device as defined in claim 1, said connecting means comprising a pair of jacks provided in the closed ends of the respective sections in conductive connection with said internal circuit.

7. A device as defined in claim 4, said connecting means further comprising a pair of jacks provided in the closed ends of the respective section in conductive connection with said internal circuit, said jacks being dimensioned for receivably receiving said test probes.

8. A device as defined in claim 6, wherein said jacks have respective bores of an inner diameter of 2.6 mm.

9. A device as defined in claim 1, wherein said signal-generating means comprise an electrically operable buzzer.

10. A device as defined in claim 1, wherein said signal-generating means comprise an electric light bulb.

11. A device as defined in claim 1, and further comprising respective interior and exterior mating screw threads provided on said sections in the region of said open ends thereof.

12. An electric continuity testing device comprising, in combination, a casing including a hollow first section comprising a plurality of elongated parallel chambers one of which has an open end, and a second section receivable in said open end for closing the same; a source of electrical energy accommodated in a first one of said chambers; signal-generating means accommodated in a second one of said chambers; a helically coiled electrically insulated contractile lead normally accommodated in a third one of said chambers having said open end, said lead having one end portion fast with said first section and connected in internal circuit with said source of electrical energy and said signal-generating means, and a second end portion fast with said second section so as to be extensible from said third chamber in response to separation of said second section from said first section; and connecting means for connecting said internal circuit with an external circuit whose continuity is to be tested.

(References on following page)

References Cited

UNITED STATES PATENTS

| | | | |
|---|---|---|---|
| 2,413,484 | 12/1946 | Berger | 324—53 |
| 2,474,073 | 6/1949 | Sundt | 324—17 |
| 2,552,981 | 5/1951 | Lamb | 324—149 XR |
| 2,581,129 | 1/1952 | Muldoon | 174—69 XR |
| 2,653,297 | 9/1953 | Mohylowski | 324—51 |
| 2,954,521 | 9/1960 | McKee | 324—149 XR |
| 2,778,992 | 1/1957 | McFarland | 324—51 |
| 2,916,698 | 12/1959 | Eisenberg et al. | 324—53 XR |
| 3,046,476 | 7/1962 | McFarland | 324—53 |

FOREIGN PATENTS 333,224  11/1958  Switzerland.

GERARD R. STRECKER, Primary Examiner

U.S. Cl. X.R.

339—108